United States Patent
Khuu et al.

(10) Patent No.: US 7,911,962 B2
(45) Date of Patent: Mar. 22, 2011

(54) INTEGRATING LOCAL CONGESTION AND PATH INTERFERENCE INTO QOS ROUTING FOR WIRELESS MOBILE AD HOC NETWORKS

(75) Inventors: Phong C. Khuu, Ashburn, VA (US); Michael J. Weber, Warrenton, VA (US); Gregory S. Sadosuk, Fairfax, VA (US); Brian D. Loop, Fairfax, VA (US); John Gu, Rockaway, NJ (US); Reza Ghanadan, Berkeley Heights, NJ (US); Jessica Hsu, Clifton, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 157 days.

(21) Appl. No.: 12/103,268

(22) Filed: Apr. 15, 2008

(65) Prior Publication Data
US 2008/0298251 A1 Dec. 4, 2008

Related U.S. Application Data

(60) Provisional application No. 60/932,090, filed on May 29, 2007.

(51) Int. Cl.
*G01R 31/08* (2006.01)
(52) U.S. Cl. .................................................. 370/238
(58) Field of Classification Search ............... 370/230, 370/238, 351, 252
See application file for complete search history.

(56) References Cited

U.S. PATENT DOCUMENTS

| 2003/0128687 A1* | 7/2003 | Worfolk et al. ............... 370/351 |
| 2006/0215556 A1* | 9/2006 | Wu et al. ....................... 370/230 |
| 2008/0080473 A1* | 4/2008 | Thubert et al. ............... 370/348 |

OTHER PUBLICATIONS

Y.Ge et al., "QualitY of Service Routing in Ad-Hoc Networks Using OLSR", 36th Hawaii International Conference on System Science (Hicss 03) , Year of Publication: 2003.*
D. Blough et al. , "Topology control with better radio models:Implications for energy and multi-hop interference", Science Direct, Received Jan. 10, 2006; revised Jun. 1, 2006. Available online Oct. 11, 2006, pp. 379-398.*
J. Gao et al., Load-Balanced Short-Path Routing in Wireless Networks, IEEE Transaction on Parallel and Distributed Systems, vol. 17, No. 4, Apr. 2006.
S. Ramanathan et al., A Survey of Routing Techniques for Mobile Communications Networks, Mobile Networks and Applications, vol. 1, No. 2, pp. 89-104, 1996.
T. Clausen et al., The Optimized Link-State Routing Protocol version 2 draft-ietf-manet-olsrv2-02, Oct. 2003.
I. Chakeres et al., Dynamic MANET on-demand (DYMO) Routing draft-ieft-manet-dymo-05, Feb. 7, 2008.

(Continued)

*Primary Examiner* — Derrick W Ferris
*Assistant Examiner* — Peter Cheng
(74) *Attorney, Agent, or Firm* — Rossi, Kimms & McDowell; Marc A. Rossi; Daniel J. Long

(57) ABSTRACT

A method and apparatus is provided for using a distributed multi-path QoS-aware routing scheme that considers basic MANET characteristics to meet transport service requirements of real-time applications and makes use of multiple discovered paths to calculate a next-hop decision. The QoS Routing scheme superimposes distributed neighborhood congestion, neighborhood density, and link stability and delay information over the multiple discovered paths when the next-hop decision is calculated.

20 Claims, 6 Drawing Sheets

NODES F AND G ARE BOTH TRANSMITTING AT 30% CONTRIBUTING TO THE NCIs AT B, C, AND D

OTHER PUBLICATIONS

R. Ghanadan et al., An Efficient Intranet Networking Solution for Airborne Networks, BAE Systems Network Enabled Solutions, presented at the MILCOM 2006 Conference, Washington, DC, Oct. 23, 2006, IEEE ISBN: 1-4244-0618-8.

S. Lee et al., AODV_BR: Backup Routing in Ad hoc Networks Wireless Adaptive Mobility Laboratory, Computer Science Department University of California, Los Angeles.

S. Chen et al., Distributed Quality-of-Service Routing in Ad-Hoc Networks, IEEE Journal on Selected Areas in Communication, vol. 17, No. 8 Aug. 1999.

I. Gerasimov et al., Performance Analysis for Ad Hoc QoS Routing Protocols Laboratory for Cooperative Work Environments, Department of Computer Science International Mobility and Wireless Access Workshop (MobiWac '02).

Y. Ge et al., Quality of Service Routing in Ad-Hoc Networks Using OLSR 36th Hawaii International Conference on System Sciences (HICSS '03).

D. Nguyen et al., QoS support and OLSR routing in a mobile ad hoc network International Conference on Networking, International Conference on Systems and International Conference on Mobile Communications and Learning Technologies (ICNICONSMCL '06).

S. Choudhary et al., Path Stability Based Adaptation of MANET Routing Protocols, Distributed Computing—IWDC 2004, Springer Berlin/Hiedleberg, vol. 3326/2005, pp. 198-203.

Specification, claims, abstract and drawings of unpublished U.S. Appl. No. 11/546,783, filed Oct. 12, 2006, "Adaptive Message Routing for Mobile Ad Hoc Networks", 86 pages.

Specification, claims, abstract and drawings of unpublished U.S. Appl. No. 11/897,474, filed Aug. 30, 2007, "Topology Aware MANET for Mobile Networks", 41 pages.

* cited by examiner

NODES F AND G ARE BOTH TRANSMITTING AT 30%
CONTRIBUTING TO THE NCIs AT B, C, AND D

| Node | NCI | ETB (kbps) | PRAB to E (kbps) |
|---|---|---|---|
| A | 0 | 333 | 133.2 |
| B | 0.3 | 333 | 133.2 |
| C | 0.6 | 500 | 200 |
| D | 0.3 | 1000 | 700 |
| PRAB for path B-C-D: | | | 133.2 |

| Node | NCI | ETB (kbps) | PRAB to E (kbps) |
|---|---|---|---|
| A | 0 | 333 | 333 |
| H | 0 | 333 | 333 |
| I | 0 | 333 | 333 |
| J | 0 | 500 | 500 |
| K | 0 | 1000 | 1000 |
| PRAB for path H-I-J-K: | | | 333 |

FIG. 3

INTEGRATING LOCAL CONGESTION AND PATH INTERFERENCE INTO QOS ROUTING FOR WIRELESS MOBILE AD HOC NETWORKS

CROSS-REFERENCE TO RELATED APPLICATION

This application claims priority from U.S. Provisional Application No. 60/932,090 entitled "Integrating Local Congestion and Path Stability into QoS Routing for Airborne Tactical Networks", filed May 29, 2007, the content of which is incorporated herein by reference.

BACKGROUND

The present invention relates in general to wireless mobile ad hoc networks. More specifically, the invention relates to a method and apparatus for providing a routing protocol for wireless mobile ad hoc networks that produces an enhanced Quality-of-Service support from the network.

Routing protocols for wireless mobile ad hoc networks (hereinafter "MANETs") have been extensively explored in recent years. Most of the work completed thus far, however, has focused on finding a feasible route from a source to a destination in a timely and efficient manner without considering the impact on the transport performance of existing application traffic or the newly added flows. As a result, parts of the network may become saturated with no means of automatically compensating or routing traffic around the overloaded areas, which results in a lowering of network efficiency. While this limitation may be tolerable for best-effort or delay-tolerant data transfers, real-time applications require a certain level of Quality-of-Service (hereinafter "QoS") from the network. Accordingly a comprehensive MANET QoS solution would benefit from a QoS-aware routing scheme that takes into account the application's transport requirements and the data transport conditions of available data paths through the network.

Some QoS architectures include a resource reservation function where network resources such as link bandwidth and queue size are allocated to ensure the timely transport of user data. A typical resource reservation process has two essential steps: a) finding resources; and b.) making reservations. Resource reservation can only be made when a routing protocol has found paths with sufficient resources to meet user requirements. User data QoS requirements and the transport capabilities of the path must therefore be taken into consideration when making a path selection.

In traditional data networks, routing is primarily concerned with connectivity. Examples of conventional routing protocols and techniques can be found in the following references, the contents of each of which is incorporated herein by reference: U.S. patent application Ser. No. 11/546,783, filed on Oct. 12, 2006, entitled Adaptive Message Routing for Mobile Ad Hoc Networks; U.S. patent application Ser. No. 11/897, 474, filed Aug. 30, 2007, entitled Topology Aware MANET for Mobile Networks; Load-Balanced Short-Path Routing in Wireless Networks, Jie Gao, Li Zhang, IEEE Transaction On Parallel and Distributed Systems, VOL. 17, NO. 4, April 2006; A Survey of Routing Techniques for Mobile Communications Networks, S. Ramanathan and M. Steenstrup, Mobile Networks and Applications, vol. 1, no. 2, pp. 89-104, 1996; H. Kopetz, W. Schwabl, Global Time in Distributed Realtime Systems. Technical Report 15/89, Technishe Univesität Wien, 1989; The Optimized Link-State Routing Protocol version 2 draft-ietf-manet-olsrv2-02, T. Clausen, C. Dearlove, P. Jacquet; Dynamic MANET On-demand (DYMO) Routing draft-ietf-manet-dymo-05, I. Chakeres, C. Perkins.

Conventional routing protocols usually characterize the network with a single metric, such as hop-count or delay, and use shortest-path algorithms for path computation. In order to support a wide range of QoS requirements, however, routing protocols need to have a more complex model where the network is characterized with multiple metrics such as available bandwidth, delay, and loss probability. The basic problem of QoS Routing then is to find a transmission path that satisfies multiple constraints while maximizing residual network resources and still meeting transport requirements of the offered load; i.e., consume the smallest amount of network resources to convey the traffic within the required performance parameters. Accordingly, a need exists for an apparatus and method to improve QoS Routing to find a path that satisfies multiple constraints.

SUMMARY OF INVENTION

A method and apparatus for providing a distributed multi-path QoS-aware routing scheme that considers basic MANET characteristics (e.g., neighborhood congestion and path stability) to meet the transport service requirements of real-time applications is provided. In a preferred embodiment, the QoS Routing scheme superimposes a distributed neighborhood congestion parameter, a neighborhood density parameter, a link stability parameter and a delay information parameter over multiple discovered paths when it calculates a next hop decision. At each routing hop along the path, network traffic is dispatched along the appropriate next-hop according to the path's QoS metrics that are computed from network conditions such as previous and projected neighborhood congestion level, link stability, link rate, link quality, and neighborhood density. This allows networks to better adapt to rapidly changing MANET environments such as those found, for example, in airborne tactical edge networks.

In one preferred embodiment, the invention is implemented in a network having a plurality of network communication nodes, wherein each of the network communication nodes includes a communications link that provides communications with neighboring network communication nodes within the network and a controller coupled to the communications link. The controller determines a local congestion metric and transmits the local congestion metric to neighboring network communication nodes via the communications link. The controller then receives local congestion metrics from the neighboring network communication nodes via the communication link and calculates a neighborhood congestion indicator. The neighborhood congestion indicator is used by the controller to calculate a path remaining available bandwidth from the controller's node to at least one destination node within the network for each path from the controller's node to the destination node. The controller then selects a next hop in the desired path for transmission of data via the communication link from the controller's node to the destination node based on the calculated path remaining available bandwidths.

The controller preferably calculates the local congestion metric based on the percentage of time the controller's node is transmitting Non-Best-Effort traffic (namely traffic that requires qualitative or quantitative transport guarantees from the network). The controller calculates a neighborhood congestion indicator as the sum of the local congestion metrics from its 1-hop neighbors. The controller calculates a total neighborhood congestion indicator as the sum of the local congestion metrics from its 1-hop neighbors plus its own local congestion metric.

The controller calculates the path remaining available bandwidth based upon the distance to the destination node. The path remaining available bandwidth calculation preferably includes either a one-hop calculation, a two-hop calculation or a three-hop calculation.

Additional parameters or metrics may also be calculated and utilized to select the desired transmission path including an interference cost metric, a path stability metric, and a path delay metric. These metrics, along with the path remaining available bandwidths, can be incorporated into a weighted objective function to select the desired path. Preference may also be given to previously selected paths.

BRIEF DESCRIPTION OF THE DRAWINGS

The present invention will be further described with reference to certain preferred embodiments thereof and the accompanying drawings wherein:

FIG. 3 is a table illustrating neighborhood retransmission bandwidth and path remaining available bandwidth calculation to node E;

DETAILED DESCRIPTION OF THE PREFERRED EMBODIMENT

Figure 2:
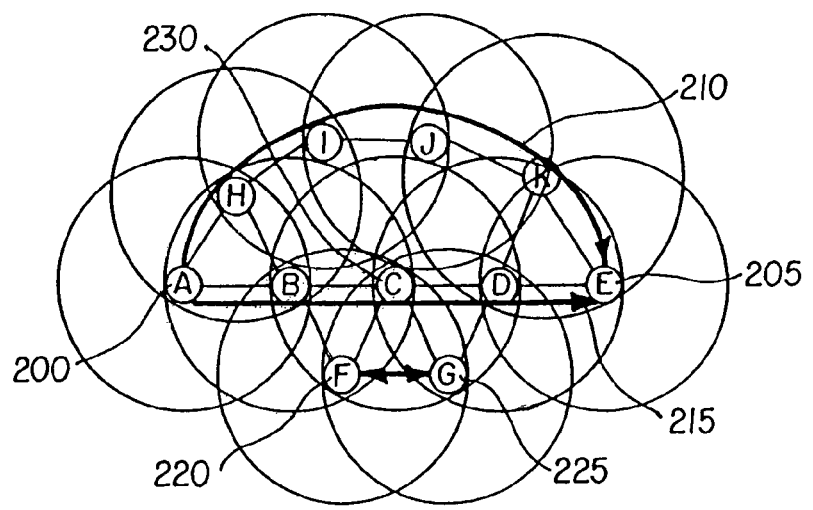
FIG. 2 is a schematic drawing showing an example of a path remaining available bandwidth calculation to node E.
Figure 8:
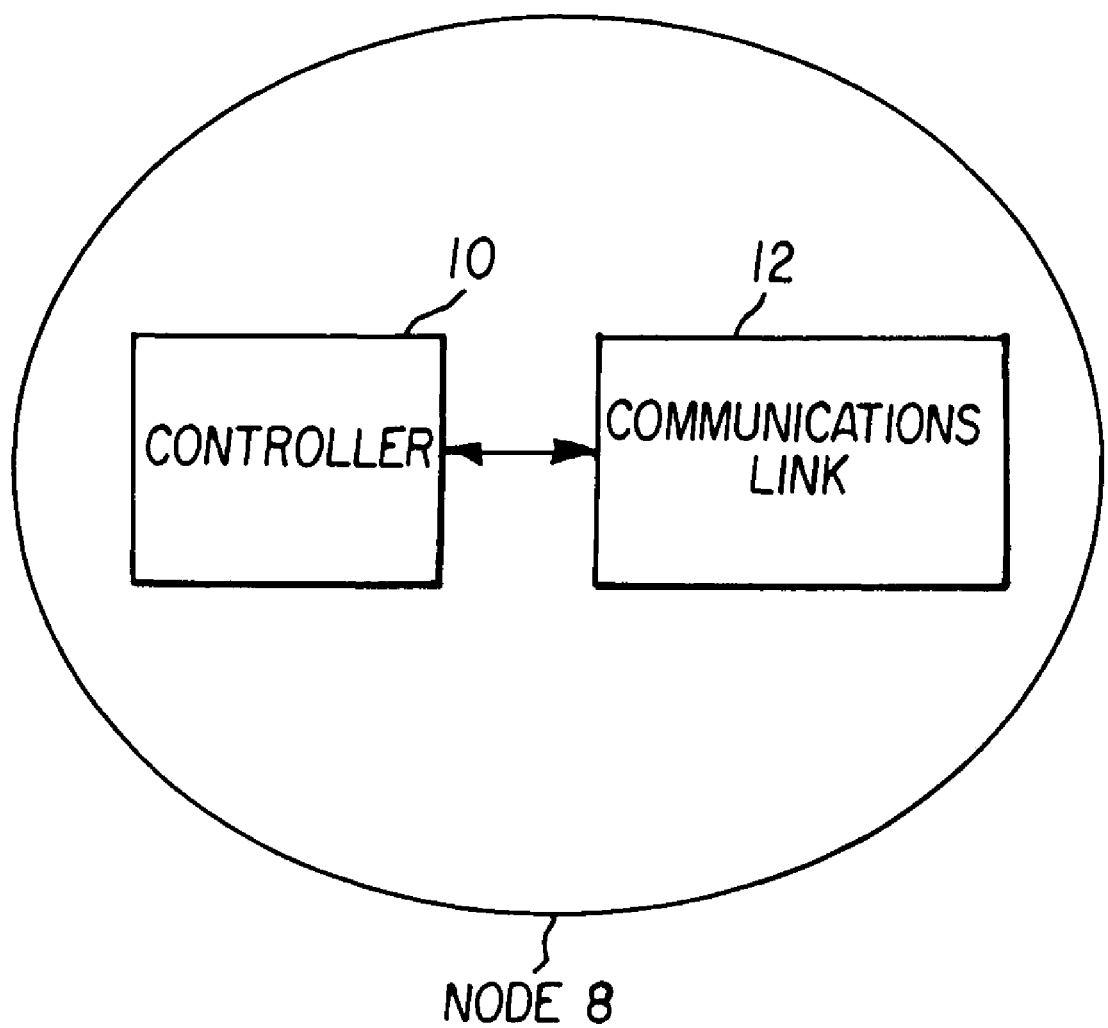
FIG. 8 is a schematic block diagram illustrating a node.

A very simple explanation of the effects achieved by the present invention will first be discussed with reference to FIG. 2, which illustrates a wireless communication network have a plurality of nodes A through K. As will be readily understood by those skilled in the art, each of the nodes 8 includes a controller 10 coupled to a communications circuit or link 12 as illustrated in FIG. 8. The controller 10, as just a few representative examples, may be implemented utilizing a general purpose programmable processor, application specific integrated circuitry or various combinations of hardware, software and firmware with associated memory. Similarly, the communications link 12 may include various conventional receiver and transmitter circuitry operating at various frequencies and data transmission rates. The solid lines between nodes in FIG. 2 represent existence of bi-directional communications transmissions between the nodes, each of which is assumed to have the same data rate for the purposes of this discussion. Neighboring nodes are defined as those nodes that are within one-hop communication with each other. For example, node A has neighboring nodes H and B, while node B has neighboring nodes A, H, C and F in the example illustrated in FIG. 2.

Data is transmitted between the various nodes in accordance with an established communication protocol. For example, data is transmitted from node A to node E along a path selected in accordance with the communication protocol. It is, of course, desirable that the selected path represent the best path for transmitting the type of data being transmitted. In the case of a high priority message, it would be desirable to transmit the data along the shortest and fastest path between node A and node E. Conventional protocols typically employ a shortest-path-first approach which would typically select the B-C-D path as being the most direct and therefore fastest route. Such a selection, however, does not take into account the congestion present at various nodes along the path or the added congestion that the transmission of the new traffic will add to each of those nodes.

As will be described in greater detail below, the present invention takes into account a local congestion metric (LCM) and a neighborhood congestion indicator (NCI) to calculate the total path remaining available bandwidth (PRAB) from node A to node E along all known paths within the network. A comparison is then made among those paths to determine which path is actually the most efficient path for transmitting the data. In one example which will be discussed with reference to FIG. 2, the best path actually turns out to be H-I-J-K even though this path is geographically longer and includes more nodes than B-C-D. With the above as background, the generation of QoS Routing in accordance with the invention will now be described in greater detail.

QoS Routing functions can be partitioned into two functional groups. The first functional group deals with routing metrics definition and computation and disseminating these metrics to neighboring nodes within a network. The second functional group applies collected routing metrics to a forwarding decision engine and selects a path comprising links capable of supporting user traffic transport requirements.

Routing metrics are the representation of a network and so must reflect the basic characteristics of a network. The information they contain should be both relevant to the QoS requirements of supported applications and easy to process by the path selection algorithms. When a network node performs path selection, it must be able to map the traffic's QoS requirements into the constraints associated with a path expressed in terms of the chosen metrics. Thus, the chosen QoS metrics determine the types of QoS that the network can support and the ease with which the QoS requirement mapping is done. For example, if delay and bandwidth are the chosen metrics, all QoS transport requirements for the user traffic must somehow be mapped onto the delay and bandwidth metrics.

Parameters that may be considered for use as QoS Routing metrics include delay, delay variation (jitter), cost, loss probability, and bandwidth. The path's bottleneck bandwidth (congestion), delay, and path stability reflect some fundamental characteristics of a path in the mobile ad hoc network, and are adopted as QoS Routing metrics in the present invention. In addition, the present invention's QoS Routing solution uses the neighborhood density data as the cost metric. The cost metric is adopted based on the observation that in an airborne networking environment (such as the military inter-computer data exchange format of NATO, the North Atlantic Treaty Organization Specification, Link-16, MIL-STD-6016C), there is a limit on the number of transmissions allowed within certain wireless network neighborhood coverage. Also, in a wireless network networking environment, data transmission into one neighborhood where there are more nodes sharing the same wireless network channel will cause interference to more nodes than a data transmission into another neighborhood with fewer nodes.

In general, path metrics are calculated and maintained for the destination node via proactive or reactive route discovery methods. See, for example, U.S. patent application Ser. No. 11/546,783; The Optimized Link-State Routing Protocol version 2 draft-ietf-manet-olsrv2-02, T. Clausen, C. Dearlove, P. Jacquet; Dynamic MANET On-demand (DYMO) Routing draft-ietf-manet-dymo-05, I. Chakeres, C. Perkins. Ideally, multiple paths to a destination should be discovered and make available for routing and the path metrics for each discovered path calculated. Multipath routing increases the probability of finding a path capable of providing the needed transport service requirements. In addition, any alternative paths are available before a link failure triggers the re-routing process. When alternative paths exist, re-routing of user traffic can occur immediately using the alternate paths, enabling the network to more quickly adapt to the changes in the environment. Dynamic and hop-by-hop path repairing is supported, allowing the repair to be done at the break point by shifting traffic to neighboring nodes and re-configuring the path around the breaking point The path selection algorithms should consider not only the user traffic transport requirements against the paths' metrics but also the optimality of network routing. Lower-cost paths are preferred in order to improve overall network performance. In a per-hop routing architecture, it is not possible for any given source node to know the exact path a transmission data packet will end up traveling. Therefore, in practice, a mechanism for accumulating the various indicators and propagating them along with the other topology data the routing protocol uses to determine routes to distant nodes is required. Two underlying assumptions are 1) that the routes that data packets will take are similar to the routes calculated from those topology dissemination packets, and 2) that the data packets will experience network conditions similar to those recorded by the topology dissemination packets. Simulations bear these assumptions out.

QoS Routing metrics should be constructed orthogonally to one another to avoid their conveying redundant information. Redundant information can introduce interdependence among the metrics, making it impossible to evaluate each metric independently. The following details the metrics chosen for a QoS Routing scheme and their definitions in accordance with the present invention.

Figure 1:
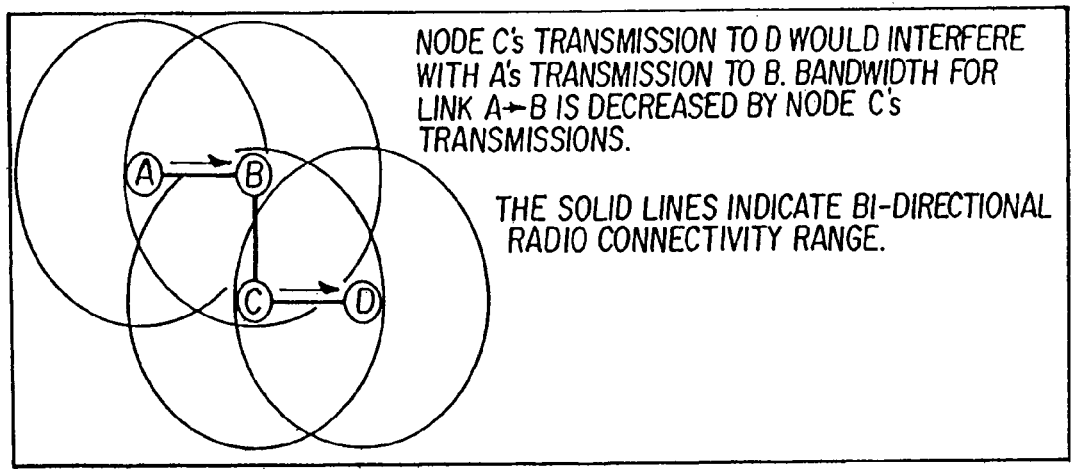
FIG. 1 is a schematic drawing showing an example of wireless network neighborhood interferences.

In common channel wireless networking, interference due to the hidden node problem may corrupt packet reception if another node in the receiver's one-hop neighborhood transmits at any point during the packet's reception. FIG. 1 illustrates how the inbound network bandwidth at node B is limited by the transmissions of B's other one-hop neighbors, either by RTS/CTS-type protocols that defer access by potentially interfering nodes, or by scheduling schemes. In practice, the range at which a receiver can experience interference from a transmitter is greater than the distance at which that receiver can successfully receive packets from that same transmitter (i.e., the interference range is greater than the communication range), a reality which increases the problem of hidden nodes. The NCI is utilized to take into consideration this interference-driven bandwidth limitation.

Network QoS Routing schemes define residual or available path bandwidth for new traffic along a path as a metric based on the minimum free bandwidth of the links in a path, i.e., the bottleneck bandwidth or "weakest link." For example, let B(i, j) be the bandwidth metric for the link between i and j (i, j). For any path p=(i, j, k, . . . , q, r) the general residual bandwidth B(p) is defined as:

$$B(p)=\min[B(i,j),B(j,k),\ldots,B(q,r)]$$

As illustrated in FIG. 1, however, a wireless network's residual bandwidth is constrained by factors beyond the link utilization level (and thus the residual bandwidth) of the nodes in the path. Consequently, the channel utilization level, which is shared by all nodes within the interference domain of the nodes in the path, must be taken into consideration. In the present invention, each node calculates its own LCM. The value is calculated by tracking the amount of time used for transmitting non-best-effort (NBE) traffic divided by the a given time interval. On communications nodes where constant transmission is not possible, the divisor will be the calculated as the maximum amount of time that the node could have been transmitting rather than a continuous time interval.

The calculation of a NCI follows directly. For example, given a node (i) with (k) one-hop neighbors, the NCI for the one-hop neighborhood of (i) is defined as the sum of the LCMs of node i's k neighbors:

$$NCI_i = \sum_{j=1}^{k} LCM(j)$$

For example, in the network illustrated in FIG. 1 $NCI_B$=LCM(A)+LCM(C).

Next, the congestion metric for an entire path is defined in terms of the minimum available bandwidth remaining along the path or PRAB. Each node calculates the PRAB for a path from two factors: 1) the available time to leverage the effective retransmission bandwidth (ETB) and 2) the ETB available along the path. The general PRAB formula is shown below:

$$PRAB=(Available\ Time)*ETB$$

ETB for the general PRAB formula can be calculated as follows: at any node (i) in the path, the data sent along the path will be received and retransmitted by (i). Since the traffic must be received and retransmitted, the maximum ETB through node (i) is, at best, half the link rate at node (i). If the link rate into node (i) is not the same as the link rate out of node (i) towards the next hop, then the relationship between the link speeds further reduces the throughput bandwidth achievable at node (i). The one-hop ETB at node (i), used when node (i) is the final destination, is given by:

$$R_{h\to i}$$

where $R_{h\to i}$ is the ingress link rate at node (i). The two-hop ETB at node (i), used when the node receives data from a 1-hop neighbor (h) and the data has a different 1-hop neighbor (j) as its final destination, is given by:

$$\left(\frac{R_{h\to i}R_{i\to j}}{R_{h\to i}+R_{i\to j}}\right)$$

where $R_{h\to i}$ is the ingress link rate and $R_{i\to j}$ is the egress link rate at node (i). In cases where $R_{h\to i}$=$R_{i\to j}$, this factor equals half of the link rate. If the final destination of the data is not a one-hop neighbor of (i), the time available for (i) to transmit is further reduced by the time that the next one-hop neighbor (j) spends retransmitting the traffic to its 1-hop neighbor node (k). In this three-hop case, ETB involves three links, the link between (h) to (i) represented as $R_{h\to i}$, the link between (i) to (j) represented as $R_{i\to j}$, and the link (j-k) represented as $R_{j\to k}$:

$$\left( \frac{R_{h \to i} R_{i \to j} R_{j \to k}}{(R_{h \to i} R_{i \to j}) + (R_{h \to i} R_{j \to k}) + (R_{i \to j} R_{j \to k})} \right)$$

The ETB calculation is valid for all multiple access domains limited by omni-directional or broadcast interference.

Available time quantity for the general PRAB formula can be calculated using one of the following preferred methods: 1) the node calculates a total neighborhood congestion indicator (TNCI) for itself and for the first hop toward the destination and uses the larger value as the limiting factor, as in $(1 - \max(TNCI_i, TNCI_j))$; or 2) the node calculates an expected availability factor (EAF) for two TNCIs for nodes (i) and node (j) expressed as integer percentages (e.g., 32=32% total usage) as follows:

$$AvailableTime = 1 - \left( TNCI_i + TNCI_j - \left( \frac{(TNCI_i)(TNCI_j)}{100} \right) \right)$$

Other methods of calculating the available time quantity are appropriate to other specific MAC and PHY methods, but all of them result in an estimate of available transmission time for use in the PRAB formulas. For example, in a slotted MAC system, the global slot schedule can be used to precisely predict a node's available transmission time and interference in any 1-hop neighborhood.

A node may at any time calculate a PRAB to any of its one, two, or three+ hop neighbors using one of the PRAB formulas shown below. For simplicity, the alternate EAF method is shown only for the one-hop PRAB calculation, but one skilled in the art can readily expand the method to the two and three hop cases.

One-Hop PRAB Case $$PRAB_1(P_i) = (1 - \max(TNCI_h, TNCI_i)) R_{h \to i}$$

or $$PRAB_1(P_i) = \left( 1 - TNCI_h + TNCI_i - \left( \frac{(TNCI_h)(TNCI_i)}{100} \right) \right) R_{h \to i}$$

Two-Hop PRAB Case $$PRAB_2(P_j) = (1 - \max(TNCI_h, TNCI_i)) \left( \frac{R_{h \to i} R_{i \to j}}{R_{h \to i} + R_{i \to j}} \right)$$

Three-Hop PRAB Case $$PRAB_3(P_k) =$$
$$(1 - \max(TNCI_h, TNCI_i)) \left( \frac{R_{h \to i} R_{i \to j} R_{j \to k}}{(R_{h \to i} R_{i \to j}) + (R_{h \to i} R_{j \to k}) + (R_{i \to j} R_{j \to k})} \right).$$

An example scenario illustrating the ETB and PRAB calculation is shown in FIG. 2. To simplify the example, assume all link rates are equal at 1 Mbps (megabits per second). Node A (200) has a 300 kbps (kilobits per second) traffic flow to route to node E (205). There are at least two candidate paths, one traversing B-C-D (215) and one traversing H-I-J-K (210). Nodes F (220) and G (225) are currently exchanging non-best-effort traffic which consumes 300 kbps of available bandwidth in each direction, creating a congested neighborhood at node C (230) even though the links along candidate path B-C-D (215) are not themselves congested. A typical shortest-path-first QoS Routing algorithm, even one analyzing links along the path, would select the B-C-D path. This selection would create severe congestion in C's neighborhood and result in significant data loss for both the existing flow between nodes F and G and the new flow between A and E.

FIG. 3 contains the calculated PRABs and it shows the higher PRAB score for the H-I-J-K route comparing to the B-C-D route. The PRAB calculation for B-C-D route is as follows: PRAB to node E at node D is (1−0.3)*1 Mbps=700 kbps. From node C, the two-hop PRAB to E is (1−0.6)*500 kbps=200 kbps. The three-hop PRAB from B is (1−0.6)*333=133.2 kbps. At A, the three-hop PRAB is 233 kbps, but the smaller 133.2 already encountered takes precedence. The PRAB calculation for path H-I-J-K-E from A is done in a similar procedure and produces a value of 333 kbps. As shown, a PRAB-informed route selection allows the available network resources to be fully utilized instead of over-subscribing node C and causing degradation to both flows in the network.

In a MANET environment, sending data on a path through a densely populated network neighborhood will cause interference to more network nodes than a transmission through a sparsely populated network neighborhood. From a global network capacity perspective, it is advantageous to route packets along paths which cause less interference, which requires the neighborhood density information to be included in the path cost metric. Overall path length must also be taken into account for the greater impairment opportunity imparted by additional hops. Therefore, the ICM includes both an interference factor and a path length factor with appropriate weights ($\alpha$ and $\beta$):

$$ICM = \alpha \alpha Cost_{Length} + \beta Cost_{Interference}$$

Where $Cost_{Length}$ is the hop count and $Cost_{Interference}$ is the induced interference/congestion factor. Given that the degree of a node is its number of one-hop neighbors, $Cost_{Interference}$ is simply the sum of the degree of nodes along a path. Consider the paths from H to E in FIG. 2: B-C-D and I-J-K. The hop count and Length Cost for both paths is 4. The Interference Cost for B-C-D is 12. The Interference Cost for I-J-K is 7. Therefore, the ICM for path B-C-D is 4+12=16, and the ICM for path I-J-K is 4+7=11.

In a generic MANET environment, each pair of nodes is connected by a pair of unidirectional communications links which usually (but not always) exhibit similar performance in each direction. For example, for nodes (i) and (j) within some nominal communications range R, link ($I_{ij}$) implies that (j) receives messages transmitted by (i) and link ($I_{ji}$) implies that node (i) receives messages transmitted by (j). Each node records link performance data, such as signal-to-noise ratio (SNR), as an indicator of the historical link quality between itself and a neighboring node. By examining recent link performance data, assessments and predictions about path stability may be made. For example, if the $SNR_{ij}$ associated with link ($I_{ij}$) moves below a certain threshold, $I_{ij}$ can be assumed failing or broken. For this version of the protocol, a node (i) maintains a recent $SNR_{ij}$ track where $j \in N_i$. Two metrics describing the track are produced and then combined to form PSM. The first metric describes the relative volatility of the track by measuring the variance of the samples in the track. The second metric describes the SNR trend via a weighted moving average. These metrics may be combined to produce the PSM at time (t) such that negative SNR trends reduce the indicator slightly faster than positive trends improve it. One skilled with the art can easily derive an alternative PSM formulation utilizing any of the link metrics such as the SNR.

There are four main delay components for radio networks: queuing, channel access, transmission (i.e., serialization), and propagation delays. Note that the queuing and channel access delays are determined by the bottleneck bandwidth (or link utilization level) and traffic characteristics. Since queuing and channel access delays are already reflected in the congestion metric, we need to consider only the propagation and transmission delays in the path delay metric to ensure that the two metrics are independent. Although the end-to-end propagation delay is a fundamental characteristic of a path through the network, it is negligible (e.g., 3.3 us per km for free space propagation). Thus, only the transmission delay is considered for the path delay metric. To approximate the transmission delay at each hop in the path, the inverse of the link rate is used. The link rate information is advertised via link state updates and/or route discovery messaging. Let $D(i, j)$ be the transmission delay for link $(i, j)$. For any path $P=(i, j, k, \ldots, l, m)$ the PDM from node (P) may be defined as $$PDM(P)=D(i,j)+D(j,k)+\ldots+D(l,m),$$

One skilled in the art can easily derived an alternative PDM formulation utilizing any of the link delay metrics.

In the present invention, the QoS Routing solution performs QoS route selection at each hop along the path, heuristically dispatching traffic to the appropriate next hop according to the remaining path's QoS metrics. Hop-by-hop QoS Routing allows the network to better adapt to the changing environment by allowing local optimization anywhere along the expected path.

Different path selection algorithms are needed for traffic having different QoS transport requirements. For example, a path selection algorithm for traffic with end-to-end transport delay requirements needs to take into account the path delay metric in addition to other path metrics, while the algorithm for bandwidth sensitive traffic does not. In the following section, path selection algorithms are presented for two example traffic types: bandwidth and delay sensitive traffic.

During the normal course of a routing protocol's operation, a node will undertake to inform other, distant (>2 hops) nodes of its neighbors and the routing metrics along the paths to reach those neighbors. As the information travels from the originating (a.k.a. Source) node, each node along the path updates its local representation of the network from the received information. In addition, each node may update the received information before transmitting it to its 1-hop neighbors. This information dissemination and network representation update are part of the normal routing protocol operation and will be referred to as dissemination process Topology Update (TUd) messaging, irrespective of the protocol's design (proactive, reactive, link-state, etc.). Whatever form this information dissemination takes in a given routing protocol, it may be enhanced as described below to convey PRAB metric data to distant nodes along a path, regardless of path length. When the TUd arrives at the distant node, the information it carries will reflect the PRAB metric data for the path it traveled to reach the distant node. This is the QoS enhancement function.

For example, a Source node, upon transmitting a TUd message, includes the 1-hop PRAB in the neighbor node information areas of the message. Node X, which is a neighbor of the Source node, receives the TUd message and processes the message. Some of the nodes listed in the TUd may also be 1-hop neighbors of Node X, while some may be two hops away on the other side of Source. For those nodes in the TUd which are 1-hop neighbors, Node X compares the 1-hop PRAB to them with the 2-hop PRAB to them through Source and makes a note of the results in its routing databases. When the time comes for Node X to pass along this learned topology information, it updates the TUd message such that the node information reflects the best PRAB available to those nodes through node X. Node X then transmits a TUd in accordance with the normal TUd messaging process.

Node Y, which is a neighbor of Node X and two hops from the Source node, receives the TUd message and processes the message. It also checks the node information area for 1-hop and 2-hop nodes and applies the appropriate PRAB formulas and comparisons as described above. Nodes in the TUd node information area which are 3-hops from Node Y are processed as follows. For each node in the TUd, Node Y calculates the 3-hop PRAB to it. If the calculated PRAB is lower than the PRAB contained in the node information area for that node, the calculated PRAB is considered the PRAB from Node Y to that node and Node Y records that information in its database. If the calculated 3-hop PRAB is higher than the PRAB contained in the TUd's node information area, the lower PRAB from the TUd message is considered the PRAB from Node Y to that node and Node Y records that information in its database. Node Y transmits a TUd with the correct PRAB from its perspective in accordance with the normal TUd messaging process. Node Y notes the results of all PRAB calculations and comparisons in its routing databases, keeping note of the PRABs along two and >2 hop routes to all destinations.

Node Z, which is a neighbor of Node Y, receives the TUd message and processes the message. Node Z follows the same process as Node Y, although it is expected that most nodes in the node information area will be three or more hops away, and that their PRABs will be updated if they are lower than the information being propagated in the TUd. In this fashion, each node learns the bandwidth constraints along various paths to remote (>2 hop) destinations. Nodes are allowed to increase the PRAB representation if they have a better 1 or 2-hop path to a node described in a TUd, but no node is allowed to increase the >2 hop PRAB, because doing so would "hide" a distant congestion area.

The above-described QoS Routing solution was evaluated using the OPNET network simulator. Instead of building a behavioral OPNET model, the solution was prototyped in C code and integrated it into OPNET Modeler using the software-in-the-loop (SITL) technique.

A hybrid MANET routing protocol called Adaptive Hybrid Domain Routing (AHDR) of the type described in U.S. patent application Ser. No. 11/546,783 was utilized as the base routing for the evaluation. AHDR implements a combination of proactive and reactive schemes for topology discovery and maintenance and route discovery. To reduce the overhead of proactive routing, local link state information is periodically advertised to all 1-hop neighboring nodes similar to other protocols such as OLSR. However, network-wide topology updates are exchanged by only a subset of network nodes. A reactive component is implemented to make up for the limited topology information sharing. In other words, AHDR's routing architecture aims to share network topology data with a few nodes in the network using the proactive link state approach while the remaining nodes would query these nodes for the routes they need via the reactive scheme. The following proactive AHDR messages are exchanged:

TU0: network entry message sent by all nodes upon system initialization and network formation.

TU1: used to exchange 1-hop neighbor data and associated QoS metrics.

TUd: hierarchical, proactive topology information dissemination message, broadcasted by a subset of selected nodes to the entire network. The message contains the 1-hop neighbor data plus associated QoS metrics.

AHDR is a C code module integrated via SITL into OPNET. For all network scenarios used, the AHDR routing protocol parameter configuration was set as follows: TU0=1 secs, TU1=2 secs, TUd=20 secs, link loss is declared after missing 3 TU1s.

The QoS Routing performance was evaluated using two sets of wireless network scenarios. The first set comprises of simplified grid network scenarios to assess the protocol's maximum effectiveness in an ideal case where the network links' status is easily and accurately obtained. The second set of scenarios models a tactical airborne network, where fast-moving nodes induce a rapid topological rate of change and thus introduce inaccuracies in network topology databases at distant nodes.

Figure 4:
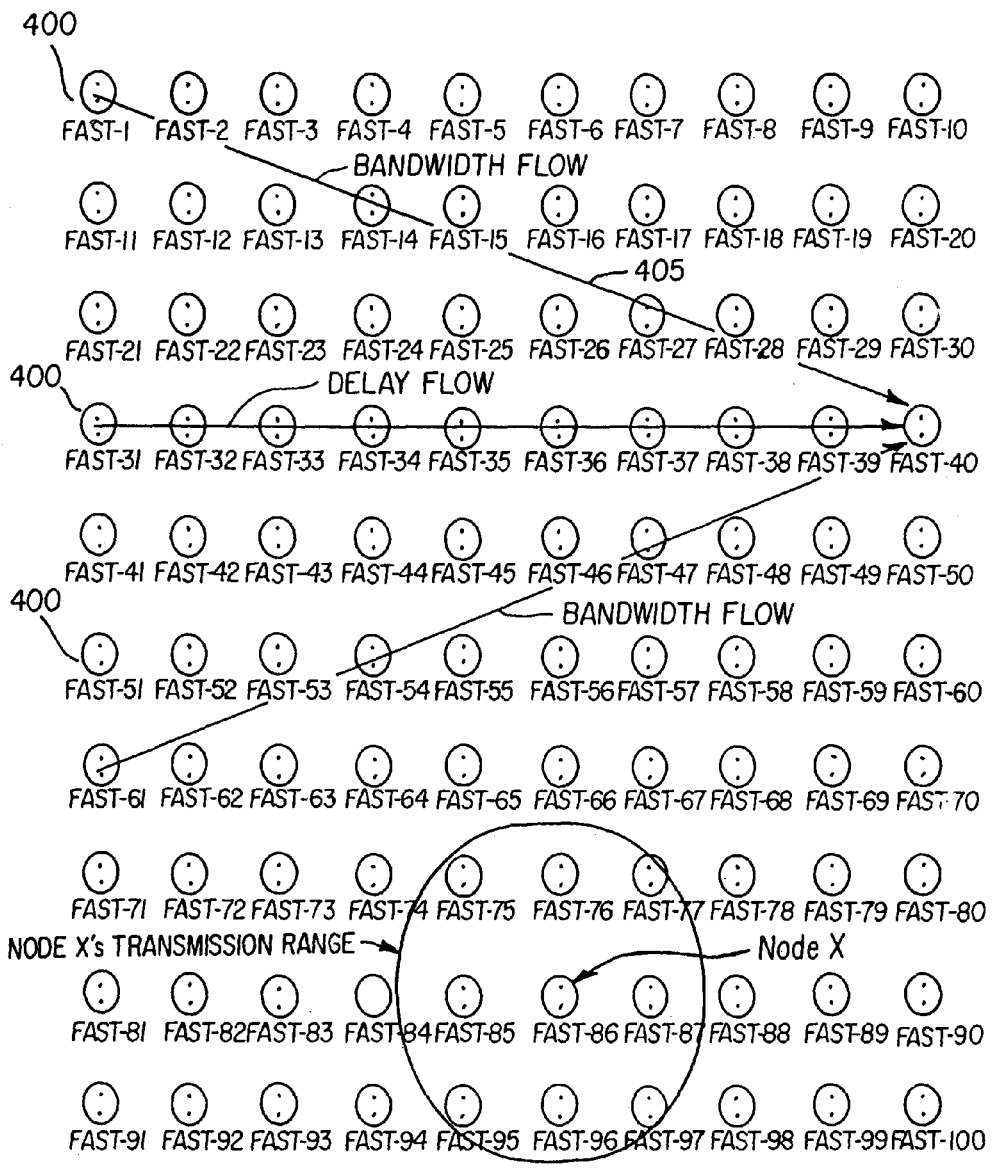
FIG. 4 illustrates an example of a simple grid network.

A performance assessment was performed in the simple grid network scenario. The following key scenario elements were defined:

Topology—A grid network with connectivity as shown in FIG. 4 yielding 8 1-hop neighbors for nodes not on the edge of the grid.

Size—An increasing number of nodes in the topology in a 3×9 (27 nodes) and 10×10 (100 nodes) grid.

Link rate—700 kbps

Mobility—stationary, high mobility (average of 20 link changes/min), and extreme mobility (average 192 link changes/min) using the 10×10 (100 nodes) grid.

Terrain/Path Loss Model—Plane-Earth

Test Traffic Profile—three non-adjacent nodes originated application traffic destined for a single target node.

Two video streaming applications generating traffic marked as bandwidth-sensitive QoS traffic at 150 kbps each One VoIP application generating traffic marked as delay-sensitive QoS traffic at 24 kbps The motivation behind the selection of the above parameters was to assess the performance gains over standard shortest path first (SPF) routing behaviors found in most existing MANET protocols. With SPF routing, all three applications would frequently traverse the same path, creating interference and contention, degrading transport performance. With QoS Routing, however, substantial performance gains could be achieved, assuming alternate paths were available for reduced interference data transport.

Figure 5:
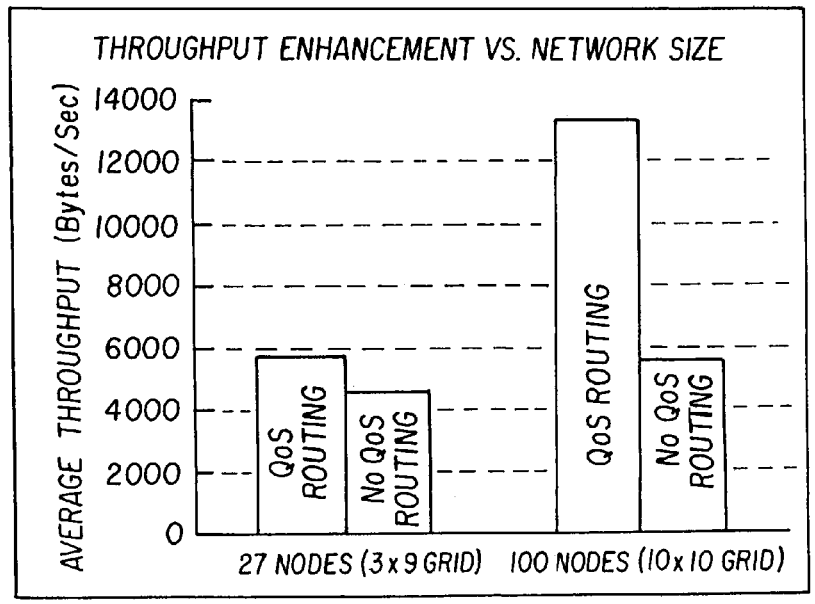
FIG. 5 is a graph illustrating average throughput in stationary grid networks.

The results for the video streaming applications are shown in FIG. 5. QoS Routing solution produced application throughput gains of 26% and 139% in the 27 and 100 node grid scenarios respectively.

Figure 6:
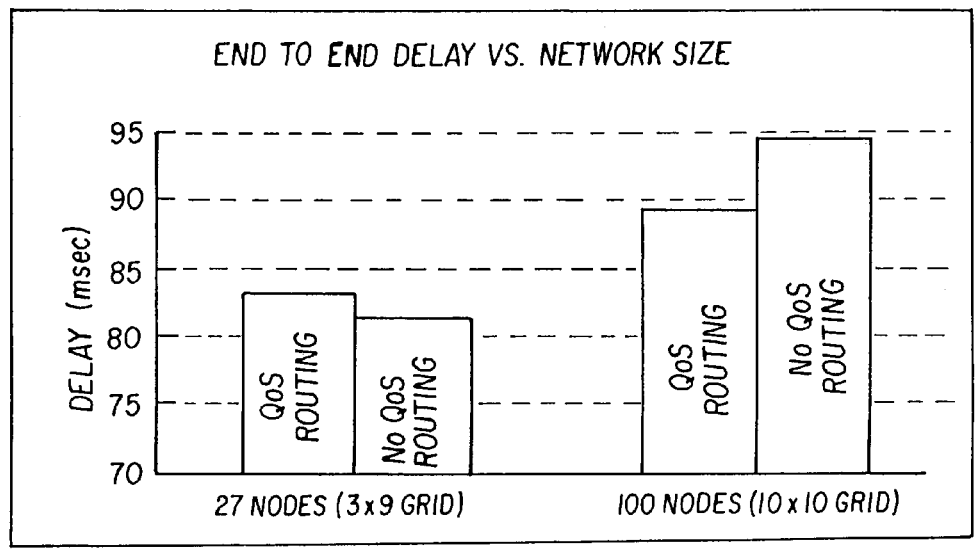
FIG. 6 is a graph illustrating end-to-end delay in stationary grid networks.

FIG. 6 shows the results for VoIP application transport in the simple grid networks. The achieved end-to-end delay performance between the 10×10 grid and 3×9 grid cases are comparable because our route selection algorithm for delay sensitive traffic is similar to that of the SPF algorithm in MANET routing protocol not supporting QoS Routing. Given a contract value of 91 msec for an 8 hop route (in the 3×9 grid), both QoS Routing and non-QoS-routing solution were able to satisfy the end-to-end delay contract. However, in the 10×10 grid case (9 hop route between the source 400 and destination node 405 in FIG. 4), only the QoS Routing solution was able to satisfy the end-to-end delay contract of 91 msec.

The simple stationary scenarios in FIG. 4 demonstrated the theoretical performance gains that QoS Routing could capture in the presence of multiple, disparate paths allowing path diversity opportunities. In the 10×10 grid scenario, substantial gains were achieved, as compared to the 3×9 grid scenario, due to the increased number of disparate paths available, creating additional opportunities for the QoS Routing algorithms to take advantage of path diversity.

In the 10×10 grid mobile scenarios, half of the nodes were mobile nodes representing fast moving tactical assets moving continuously among random waypoints. The remaining nodes represented fixed ground assets, allowing traffic to flow from air to air, air to ground, and ground to ground as circumstances demanded. The mobile nodes' speed was varied to create one high mobility use case and one extreme mobility use case. The speed for the nodes in the high mobile case was ~100 mi/hr and ~1100 mi/hr for the extreme use case. Key scenario characteristics for the use cases include: the maximum, minimum, and average link changes per minute for the high mobility case are 360, 0, and 19.8 respectively and 840, 0, and 192 respectively for the extreme mobility case.

Figure 7:
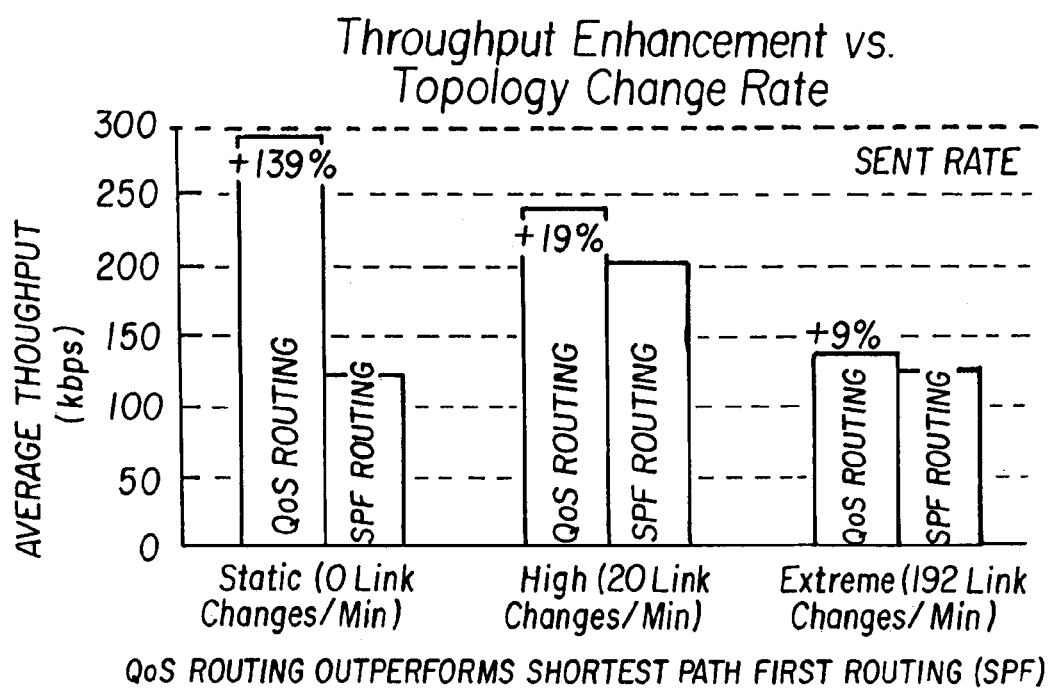
FIG. 7 is a graph illustrating user application throughput vs. time (high mobility cases)

As shown in FIG. 7, the achieved throughput in the stationary scenario, the high topology rate change scenario, and the extreme topology rate change scenario with QoS Routing activated were roughly 139%, 19%, and 9% higher respectively, compared to the non-QoS Routing cases. The extreme topology rate change scenario impacts the routing protocol's QoS metric dissemination performance, which provides the data required for QoS Routing to make the enhanced routing decisions. When a network is extremely dynamic, QoS metrics propagated throughout the network quickly The above-described distributed multi-path QoS-aware routing scheme considers basic MANET characteristics to meet the transport service requirements of real-time applications. The QoS Routing scheme is based on the superimposition of distributed neighborhood congestion, neighborhood density, link stability, and delay information over multiple paths when it calculates the next hop decision. At each routing hop along the path, the traffic is heuristically dispatched along the appropriate next-hop according to the path's QoS metrics, which are computed from previous and projected network conditions. This process allows networks to better utilize links and assets in the theater to provide additional, QoS-aware capacity. When coupled with QoS-aware queuing algorithms and media access methods, QoS Routing technology forms part of a complete, high-performance tactical edge network.

The invention has been described with reference to certain preferred embodiments thereof. It will be understood, however, that modifications and variations are possible within the scope of the appended claims. For example, the various metrics developed in accordance with the invention can be combined with one or more conventional metrics, such as hop count, to select a desired transmission path. Further, the invention is applicable to networks with varying link rates. In addition, although the invention is particularly applicable to airborne tactical networks, it can be applied to any type of wireless communication network.

What is claimed is:

1. A network comprising:
    a plurality of network communication nodes, wherein each of the network communication nodes includes a communications link that provides communications with neighboring network communication nodes within the network and a controller coupled to the communications link;

wherein the controller calculates path metrics including both a path remaining available bandwidth (PRAB) from the controller's node to at least one destination node within the network, and at least one secondary metric selected from an interference cost metric (ICM) for the controller's node based on the number of 1-hop neighbors in communication with the controller's node, a path stability metric (PSM) for each path to the destination node, and a path delay metric (PDM) for each of the available paths to the destination node;

wherein the controller selects a desired path for data transmission via the communication link from the controller's node to the destination node based on the calculated path metric; and wherein controller calculates the PRAB based on an available time quantity and an effective retransmission bandwidth (ETB) calculation; and wherein a one-hop ETB at node (i), used when node (i) is the final destination, is given by:

$$R_{h \to i}$$

where $R_{h \to i}$ is the ingress link rate at node (i), a two-hop ETB at node (i), used when the node receives data from a 1-hop neighbor (h) and the data has a different 1-hop neighbor (j) as its final destination, is given by:

$$\left( \frac{R_{h \to i} R_{i \to j}}{R_{h \to i} + R_{i \to j}} \right)$$

where $R_{h \to i}$ is the ingress link rate and $R_{i \to j}$ is the egress link rate at node (i), and a three-hop ETB, used when three links are involved is given by:

$$\left( \frac{R_{h \to i} R_{i \to j} R_{j \to k}}{(R_{h \to i} R_{i \to j}) + (R_{h \to i} R_{j \to k}) + (R_{i \to j} R_{j \to k})} \right)$$

where $R_{h \to i}$ is the ingress link rate at node (i) from node (h), and $R_{i \to j}$ is the egress link rate from node (i) to (j), and $R_{j \to k}$ is the egress link rate from node (j) to node (k) with node (k) as the next hop in the path.

2. A network as claimed in claim 1, wherein the controller determines a local congestion metric (LCM) and transmits the LCM to neighboring communications nodes via the communications link, and wherein the controller receives LCMs from neighboring communications nodes via the communications link and determines a neighborhood congestion indicator (NCI).

3. A network as claimed in claim 2, wherein the controller calculates a total neighborhood congestion indicator (TNCI) utilizing the LCM and the NCI.

4. A network as claimed in claim 3, wherein the controller calculates the available time quantity utilizing the TNCI.

5. A network as claimed in claim 2, wherein the controller determines the LCM based on the amount of time used to transmit non-best-effort traffic.

6. A network as claimed in claim 1, wherein the controller calculates the PRAB based on the available time quantity and the one-hop ETB calculation.

7. A network as claimed in claim 1, wherein the controller calculates the PRAB based on the available time quantity and the two-hop ETB calculation.

8. A network as claimed in claim 1, wherein the controller calculates the PRAB based on the available time quantity and the three-hop ETB calculation.

9. A network as claimed in claim 1, wherein the controller calculates the ICM as a weighed function of the sum of the one-hop neighbors of the nodes along the selected path and a path hop count.

10. A network as claimed in claim 1, wherein the controller gives preference to a previously selected path.

11. A method of communicating data within a network including a plurality of network communication nodes, wherein each of the network communication nodes includes a communications link that provides communications with neighboring network communication nodes within the network and a controller coupled to the communications link, the method including:

determining with the controller path metrics including both a path remaining available bandwidth (PRAB) from the controller's node to at least one destination node within the network, and at least one secondary metric selected from an interference cost metric (ICM) for the controller's node based on the number of 1-hop neighbors in communication with the controller's node, a path stability metric (PSM) for each path to the destination node, and a path delay metric (PDM) for each of the available paths to the destination node;

selecting with the controller a next hop for the desired path for data transmission via the communication link from the controller's node to the destination node based on the calculated path metric;

wherein controller calculates the PRAB based on an available time quantity and an effective retransmission bandwidth (ETB) calculation; and wherein a one-hop ETB at node (i), used when node (i) is the final destination, is given by:

$$R_{h \to i}$$

where $R_{h \to i}$ is the ingress link rate at node (i), a two-hop ETB at node (i), used when the node receives data from a 1-hop neighbor (h) and the data has a different 1-hop neighbor (j) as its final destination, is given by:

$$\left( \frac{R_{h \to i} R_{i \to j}}{R_{h \to i} + R_{i \to j}} \right)$$

where $R_{h \to i}$ is the ingress link rate and $R_{i \to j}$ is the egress link rate at node (i), and a three-hop ETB, used when three links are involved is given by:

$$\left( \frac{R_{h \to i} R_{i \to j} R_{j \to k}}{(R_{h \to i} R_{i \to j}) + (R_{h \to i} R_{j \to k}) + (R_{i \to j} R_{j \to k})} \right)$$

where $R_{h \to i}$ is the ingress link rate at node (i) from node (h), and $R_{i \to j}$ is the egress link rate from node (i) to (j), and $R_{j \to k}$ is the egress link rate from node (j) to node (k) with node (k) as the next hop in the path.

12. A method as claimed in claim 11, wherein the controller determines a local congestion metric (LCM) and transmits the LCM to neighboring communications nodes via the communications link, and wherein the controller receives LCMs from neighboring communications nodes via the communications link and determines a neighborhood congestion indicator (NCI).

13. A method as claimed in claim 12, wherein the controller calculates a total neighborhood congestion indicator (TNCI) utilizing the LCM and the NCI.

14. A method as claimed in claim 13, wherein the controller calculates the available time quantity utilizing the TNCI.

15. A method as claimed in claim 12, wherein the controller determines the LCM based on the amount of time used to transmit non-best-effort traffic.

16. A method as claimed in claim 11, wherein the controller calculates the PRAB based on the available time quantity and the one-hop ETB calculation.

17. A method as claimed in claim 11, wherein the controller calculates the PRAB based on the available time quantity and the two-hop ETB calculation.

18. A method as claimed in claim 11, wherein the controller calculates the PRAB based on the available time quantity and the three-hop ETB calculation.

19. A method as claimed in claim 11, wherein the controller calculates the ICM as a weighed function of the sum of the one-hop neighbors of the nodes along the selected path and a path hop count.

20. A method as claimed in claim 11, wherein the controller gives preference to a previously selected path.

* * * * *